(12) United States Patent
Tschache et al.

(10) Patent No.: US 10,425,398 B2
(45) Date of Patent: Sep. 24, 2019

(54) METHOD FOR CERTIFICATION BY A CONTROL UNIT OF A VEHICLE

(71) Applicant: VOLKSWAGEN AG, Wolfsburg (DE)

(72) Inventors: Alexander Tschache, Wolfsburg (DE); Timo Winkelvos, Braunschweig (DE)

(73) Assignee: Volkswagen AG (DE)

( * ) Notice: Subject to any disclaimer, the term of this patent is extended or adjusted under 35 U.S.C. 154(b) by 371 days.

(21) Appl. No.: 15/290,177

(22) Filed: Oct. 11, 2016

(65) Prior Publication Data

US 2017/0111353 A1    Apr. 20, 2017

(30) Foreign Application Priority Data

Oct. 16, 2015    (DE) .................... 10 2015 220 226

(51) Int. Cl.
| | |
|---|---|
| *H04L 29/06* | (2006.01) |
| *H04L 9/00* | (2006.01) |
| *H04W 12/04* | (2009.01) |
| *H04L 9/08* | (2006.01) |
| *H04L 9/14* | (2006.01) |
| *H04L 9/32* | (2006.01) |
| *H04W 4/04* | (2009.01) |
| *H04W 12/06* | (2009.01) |
| *H04W 84/00* | (2009.01) |
| *H04L 29/08* | (2006.01) |

(52) U.S. Cl.
CPC .......... *H04L 63/0823* (2013.01); *H04L 9/006* (2013.01); *H04L 9/0822* (2013.01); *H04L 9/14* (2013.01); *H04L 9/3268* (2013.01); *H04L 63/0435* (2013.01); *H04L 63/0442* (2013.01); *H04W 12/04* (2013.01); *H04L 67/12* (2013.01); *H04L 2209/84* (2013.01); *H04L 2463/081* (2013.01); *H04W 4/046* (2013.01); *H04W 12/06* (2013.01); *H04W 84/005* (2013.01)

(58) Field of Classification Search
CPC ............................ H04L 63/083; H04L 9/3268
USPC ....................................................... 713/156
See application file for complete search history.

(56) References Cited

U.S. PATENT DOCUMENTS 9,413,732 B2 *  8/2016  Koide ................... H04L 9/3242
9,455,979 B2 *  9/2016  Blanke .................. H04L 9/3263
(Continued)

FOREIGN PATENT DOCUMENTS

| DE | 10354107 A1 | 1/2005 |
| DE | 102010005422 A1 | 9/2010 |
| KR | 20130051636 A | 5/2013 |

OTHER PUBLICATIONS

Search Report from German Patent Application No. 10 2015 220 226.7; Jun. 20, 2016.

(Continued)

*Primary Examiner* — Bryan F Wright
(74) *Attorney, Agent, or Firm* — Barnes & Thornburg LLP

(57) ABSTRACT

A method for performing certification by a control device of a vehicle including generating a first signed certificate, which has at least one public key, and generating an associated private key; single-time introduction of the first signed certificate and of the associated private key into the control device; producing a second certificate; signing a further public key in the control device, using the private key and the second certificate; and making available the signed further public key together with the first signed certificate.

19 Claims, 1 Drawing Sheet

(56) References Cited

U.S. PATENT DOCUMENTS

| | | | |
|---|---|---|---|
| 2009/0235071 A1* | 9/2009 | Bellur | H04L 9/3268 |
| | | | 713/158 |
| 2010/0031025 A1* | 2/2010 | Zhang | H04L 63/0823 |
| | | | 713/156 |
| 2010/0040234 A1* | 2/2010 | Alrabady | H04L 9/321 |
| | | | 380/278 |
| 2010/0191973 A1 | 7/2010 | Huntzicker et al. | |
| 2013/0212659 A1 | 8/2013 | Maher et al. | |
| 2014/0270172 A1* | 9/2014 | Peirce | H04L 9/0819 |
| | | | 380/270 |

OTHER PUBLICATIONS

Menezes et al.; Handbook of Applied Cryptography; Chapter 1; 1997; pp. 1-48.
Office Action for European Patent Application No. 16188979.5; Apr. 5, 2018.
Menezes et al.; Handbook of Applied Cryptography; Chapter 12; 1997; pp. 489-541.
Office Action for Korean Patent Application No. 10-2016-0133396; Feb. 28, 2018.

* cited by examiner

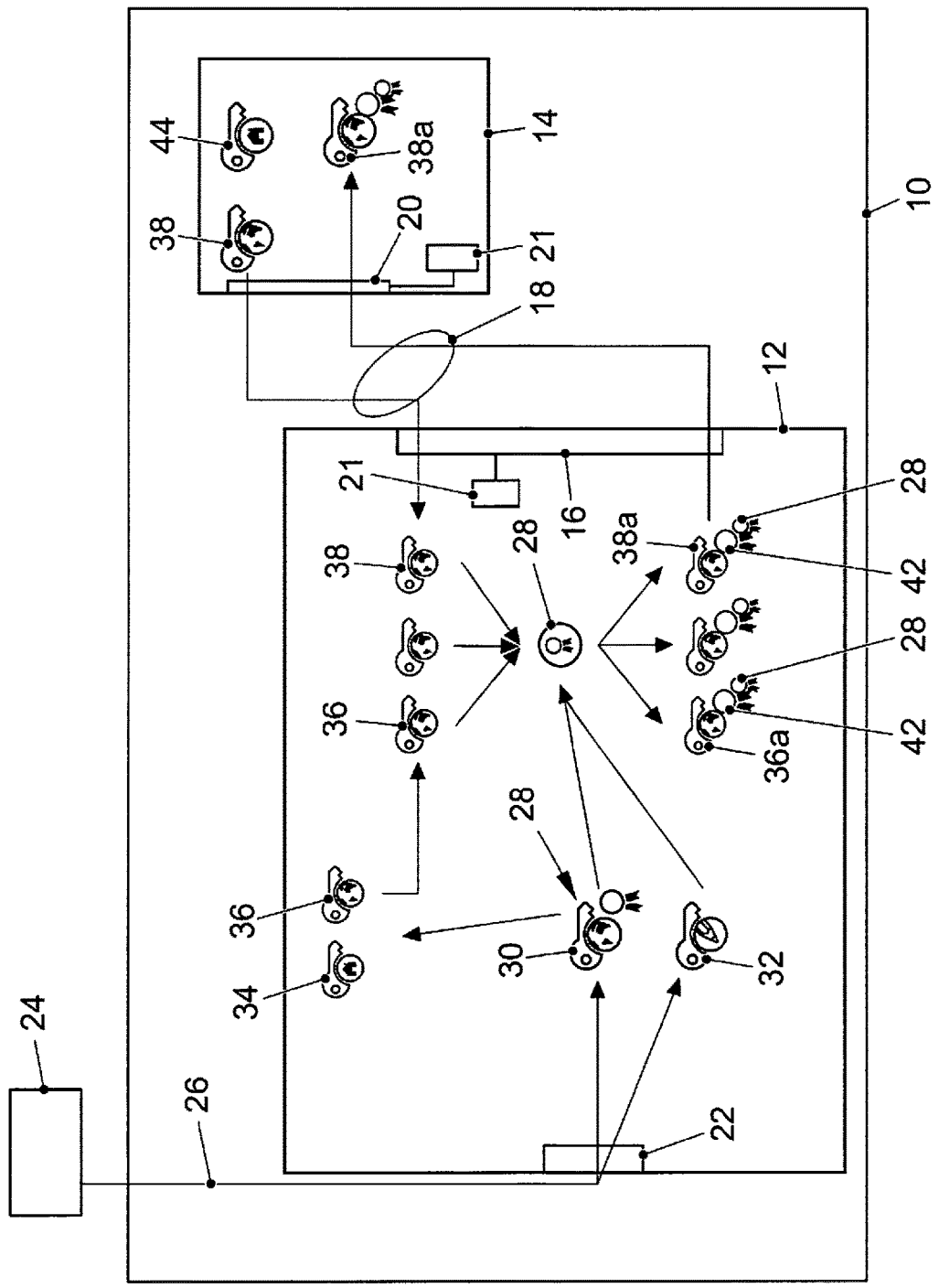

METHOD FOR CERTIFICATION BY A CONTROL UNIT OF A VEHICLE

PRIORITY CLAIM

This patent application claims priority to German Patent Application No. 10 2015 220 226.7, filed 16 Oct. 2015, the disclosure of which is incorporated herein by reference in its entirety.

SUMMARY

Illustrative embodiments relate to a method for performing certification by a control device of a vehicle, to a control device, and to a vehicle.

BRIEF DESCRIPTION OF THE DRAWINGS

The disclosed embodiments will be explained below with reference to the associated drawings, in which:

FIG. 1 shows a schematic illustration of a vehicle with a control device which serves as a certification point.

DETAILED DESCRIPTION

Authentic and protected communication of a vehicle with external points requires the connection to a Public Key Infrastructure (PKI) or the preceding exchange of common secrets. The latter exchange cannot be applied in the application cases of vehicles in the case of previously unknown communication opposite points. In addition, it is not possible to estimate in advance how many different keys or certificates are required over the product lifetime, since such keys and certificates are subject to chronological restrictions and can become invalid.

In all known solutions, the vehicle must have a self-produced certificate signed by an external point. Although this is only a PKI standard procedure, it requires a digital connection to the external signing point. However, it cannot be presumed that such a connection is always available. Furthermore, in this case the vehicle must prove its authenticity to the signing point, which entails further problems.

DE 103 54 107 A1 describes a trust centre which is external to a vehicle and which serves to authenticate a software package made available by a software provider.

Disclosed embodiments simplify the performance of certification in a vehicle.

The disclosed method for performing certification by a control device of a vehicle comprises the operations of generating a first signed certificate which comprises at least one public key, and for generating an associated private key, single-time introduction of the first signed certificate and of the associated private key into the control device, producing a second certificate, signing a further public key in the control device, by means of the private key and the second certificate, and making available the signed further public key together with the first signed certificate.

The disclosed method has the benefit that the vehicle or the control device is then capable of generating certificates itself. For this reason, it is no longer necessary to have these certificates signed by an external certification point. Instead, the vehicle or a control device of the vehicle is its own vehicle-internal certification point or Certificate Authority. There is, therefore, no need for communication of the vehicle with an external certification point, which makes an online connection superfluous. In addition, the vehicle can itself issue as many certificates as desired and does not have to be equipped with a fixed set of presigned certificates. The single-time introduction can be performed, for example, during the manufacture of the control device or of the vehicle. Further introduction processes are then no longer necessary. The single-time introduction also comprises generation of the first certificate or of the keys in the control device, signing of the first certificate in an external certification point and the subsequent introduction of the first signed certificate into the control device. During or after the signing, the first certificate or the public key is made available together with the further public key, with the result that when the signed further public key is sent to a receiver, the latter also receives the first certificate and can therefore trace back the entire certification path.

In the control device, a further public key and an associated further private key can be generated. The control device itself can therefore generate new key pairs and sign the corresponding public keys. The two further keys and can be used for a dedicated purpose of use, for example, for communication with an external service provider.

A further public key for signing by a further control device of the vehicle can be transmitted to the control device. The control device can, moreover, also sign public keys which are introduced from outside, for example, from further control devices. The control device can therefore serve as a certification entity for a further control device located in the vehicle. This signing functionality only has to be formed once in the vehicle.

The transmission path between the two control devices can be protected by symmetrical cryptographic methods such as signing. This symmetrical encryption may be established before the exchange of the further public key and the signed further public key. This has the benefit that the integrity, that is to say the unfalsified state, of this public key is always ensured.

There can be provision that the signed further public key and an associated further private key are used for setting up protected communication of the control device with a new communication partner. The signed further public key and the associated further private key are produced and used explicitly for their corresponding purpose of use, for example, for communication with an online service of an external service provider.

There can also be provision that the first signed certificate contains a vehicle-specific feature. This can be, for example, the vehicle identification number VIN or FIN. This permits simple administration, for example, in a vehicle fleet or a vehicle grouping of a vehicle manufacturer.

The first signed certificate and the associated private key can be generated by means of an external public key infrastructure. It is beneficial if a connection to a framework PKI (public key infrastructure) is ensured, with the result that external communication partners can verify the authenticity of the certificates of the vehicle. This connection does not have to exist permanently. This superordinate or framework PKI can be in multiple stages or branched, which does not, however, change anything substantial in respect of the presented method. The authenticity of the first signed certificate can also be brought about in some other way than by a superordinate PKI, for example, by means of other introduced features. This can be implemented, for example, by introducing a uniquely defined identification number, which is not the vehicle identification number into the certificate. This identification number, is then confirmed by a manufacturer backend when the connection to a third-party provider is being set up. In this context, it is possible to bring about, for example, pseudonymity with respect to third parties, that is to say the replacement of an identification feature by a pseudonym, to prevent or substantially impede identification of the vehicle. The communication partner could have these introduced features verified by an external backend of the vehicle manufacturer at the running time.

The first signed certificate can comprise a name and an indication of the time period of the validity of the certificate. This expanded information facilitates the administration within the PKI. The name can comprise the name of the manufacturer, a designation of the vehicle and/or a designation of the control device.

The disclosed control device is configured for use in a vehicle and is also configured to carry out a previously described method. The same benefits and modifications as described above apply.

The disclosed vehicle has at least one control device comprises a control device as described above. The same benefits and modifications as described above apply.

There can also be provision for the motor vehicle to have a further control device, wherein the two control devices are connected to one another via a communication path, and for the further control device to be configured to transmit a public key via the communication path to the control device for signing. The control device therefore serves as a certification entity for a further control device located in the vehicle. This signing functionality only has to be represented once in the vehicle.

The control device and the further control device can be configured to protect, for example, to sign, the connection between the two control devices by symmetrical cryptographic methods. The integrity, that is to say the unfalsified state, of the transmitted data of the public key is always ensured.

Further disclosed embodiments emerge from the other features which are specified.

The various embodiments which are specified in this application can, unless stated otherwise in an individual case, be combined with one another.

FIG. 1 shows a vehicle 10 such as, for example, a passenger car, truck, bus, motorcycle or else a rail vehicle, aircraft or watercraft. The vehicle 10 contains a first control device 12 and a second control device 14. The two control devices 12 and 14 serve for controlling in each case one or more specific functions such as, for example, an engine controller or a navigation system. Each control device 12 and 14 contains a computing unit for carrying out programs or computing functions. In principle, the method described below can also be applied to units other than control devices such as, for example, a microprocessor. Other units can be any parts of a vehicle which can carry out calculations such as key derivations, the generation of certificates or the signing of keys. For reasons of clarity, components which merely supportive functions such as, for example, a voltage supply, are not illustrated in FIG. 1.

The first control device 12 has an interface 16 for a communication connection 18 to the second control device 14. The second control device 14 has a corresponding interface 20 for a communication connection 18 to the second control device 14. The communication connection 18 can be a point-to-point connection between the two control devices 12 and 14 or a bus system such as, for example, a CAN bus. Other connection possibilities such as an ethernet connection or a wireless communication are also included here. The communication connection 18 may be signed symmetrically. For this purpose, a secret 21 is introduced into both control devices 12 and 14 when they are manufactured or when the vehicle is manufactured, which secret 21 then serves as reference for the signing of data which is transmitted via the communication connection 18.

The first control device 12 has a further interface 22 for introducing data which serves to provide the first control device 12 with the functionality of a vehicle-internal certification point or CA. The further interface 22 can also be contained in the interface 16, with the result that the first control device 12 comprises merely one interface.

The first control device is connected by means of the interface 22 to a framework PKI 24 (public key infrastructure) at least during the manufacture of the vehicle 12. This connection 26 can be cable-bound or cableless, for example, a WLAN or mobile radio network. It is also possible for this connection not to be configured directly, as illustrated, but rather indirectly, for example, via a further control device.

A first signed certificate 28, which comprises at least one public key 30, and an associated private key 32 for asymmetrical encryption, is generated in the framework PKI 24. The first signed certificate 28 optionally contains a vehicle-specific feature such as, for example, the vehicle identification number VIN or FIN. The first signed certificate 28 can also comprise a name and an indication of the time period of the validity of the certificate 28.

Via the connection 26, the first signed certificate 28, which comprises at least the public key 30, and the associated private key 32 are introduced into the first control device 12 once, for example, during the manufacture of the vehicle 10. The first signed certificate 28 authorizes the first control device 12 to sign other certificates.

Alternatively, the first control device 12 can generate a first certificate, which comprises at least one public key 30, and an associated private key 32 for asymmetrical encryption. Subsequently, the first control device 12 transmits the first certificate for signing to the framework PKI 24. The latter then sends the first signed certificate 28 back to the control device 12.

The control device 12 can sign a further certificate, or any desired number of further certificates or public keys 36 and an associated further private key 34 with the first signed certificate 28 or the public key 30 or the associated private key 32. The two further keys 34 and 36 can be used for a dedicated purpose of use, for example, for communication with an external service provider.

A further certificate, or any desired number of further certificates or public keys 38, can be introduced by the second control device 14 into the first control device 12 via the communication connection 18.

In a certification process 40 or signing process, the further public key 36 is signed or certified in the first control device 12 by means of the private key 32, which can also be referred to as a signing key, and a second certificate 42. The second certificate 42 can be produced in this process or may have already been produced. In other words, a signature is produced by means of the public key or by means of a certificate which contains the public key. As a rule, the produced signature is appended to the signed key or to the signed certificate or transmitted separately. Finally, the first certificate 28 is made available together with the signed further public key 36a and is then sent to new communication partners.

If communication with the outside then takes place with this signed further public key 36a, for example, via the interface 16 or a further interface to an external service provider, the latter can verify the signing chain up to the framework PKI 24. For this purpose, the second certificate 42 contains the further public key 36a and was signed by the private key 32. The associated certificate for the private key 32 is the first signed certificate 28 and contains the public key 30. The first signed certificate 28 is signed by the framework PKI 24.

The external service provider therefore receives the public key of the framework PKI 24. It uses the key to verify the first signed certificate 28 and therefore the public key 30, contained therein, of the control device 12. With the latter it then verifies the second certificate 42, which contains the signed further public key 36a.

The external service provider has therefore then traced back the authenticity of the signed further public key 36a to the framework PKI 24 and trusts it, with the result that the control device 12 can use the associated private key 34, together with the signed further public key 36a, for authenticated communication.

Moreover, the first control device 12 can serve as a certification point or certification entity for the second control device 14. To do this, in the certification process 40, the first control device 12 signs, similarly to the above description, the further certificate or the further public key 38 to form the signed further public key 38a, which then comprises the second certificate 42 and the first certificate 28 or has received them both together at the same time. The signed further public key 38a is transmitted back to the second control device 14 via the communication connection 18.

The second control device 14 can then set up a connection protected by asymmetrical cryptographic methods, with the signed further public key 38a and a private key 44, which is present in the control device 14 and may also have been generated by the first control device 12.

The vehicle or the control device is enabled to generate certificates itself. For this reason, it is no longer absolutely necessary to have these certificates signed by an external certification point. Instead, the vehicle, or a control device of the vehicle, is its own vehicle-internal certification point or CA (Certificate Authority).

The vehicle or the control device can, moreover, serve as a certification point or CA for other vehicles or devices. It would be possible, for example, to sign certificates of external devices, for example, smartphones, after a pairing, so that the smartphone can prove its identity later with respect to the vehicle. Furthermore, there can be provision for a plurality of such control devices, which act as CAs, to be provided in a vehicle, which constitutes reduces the benefits in terms of the centralization which is otherwise proposed, but provides benefits in terms of decentralized systems or requirements.

LIST OF REFERENCE NUMBERS

10 Vehicle
12 Control device
14 Control device
16 Interface
18 Communication connection
20 Interface
21 Secret
22 Interface
24 Framework PKI
26 Connection
28 First signed certificate
30 Public key
32 Private key
34 Further private key
36 Further public key
36a Signed further public key
38 Further public key
38a Signed further public key
40 Certification process
42 Second certificate
44 Private key

The invention claimed is:

1. A method for performing certification by a control device of a vehicle, the method comprising:
generating a first signed certificate, which comprises at least one public key, and generating an associated private key;
performing a single-time introduction of the first signed certificate and of the associated private key into the control device;
producing a second certificate;
signing a further public key in the control device, by the private key and the second certificate; and
making available the signed further public key together with the first signed certificate to one or more new communication partners.

2. The method of claim 1, further comprising generating a further public key and an associated further private key in the control device.

3. The method of claim 1, further comprising transmitting a further public key for signing by a further control device of the vehicle to the control device.

4. The method of claim 3, wherein the transmission path between the two control devices is protected by symmetrical cryptographic methods.

5. The method of claim 1, further comprising using the signed further public key and an associated further private key for setting up secured communication of the control device with a new communication partner.

6. The method of claim 1, wherein the first signed certificate contains a vehicle-specific feature.

7. The method of claim 1, wherein the first signed certificate and the associated private key are generated by an external public key infrastructure.

8. The method of claim 1, wherein the first signed certificate comprises a name or an indication of the time period of the validity of the certificate.

9. A control device for use in a vehicle, wherein the control device carries out a method for performing certification by a control device of a vehicle, wherein the method comprises generation of a first signed certificate, which comprises at least one public key, and generation of an associated private key, performance of a single-time introduction of the first signed certificate and of the associated private key into the control device, production of a second certificate, signing of a further public key in the control device, by the private key and the second certificate; and making available the signed further public key together with the first signed certificate to one or more new communication partners.

10. The control device of claim 9, wherein a further public key and an associated further private key are generated in the control device.

11. The control device of claim 9, wherein a further public key for signing by a further control device of the vehicle is transmitted to the control device.

12. The control device of claim 11, wherein the transmission path between the two control devices is protected by symmetrical cryptographic methods.

13. The control device of claim 9, wherein the signed further public key and an associated further private key are used for setting up secured communication of the control device with a new communication partner.

14. The control device of claim 9, wherein the first signed certificate contains a vehicle-specific feature.

15. The control device of claim 9, wherein the first signed certificate and the associated private key are generated by an external public key infrastructure.

16. The control device of claim 9, wherein the first signed certificate comprises a name or an indication of the time period of the validity of the certificate.

17. A vehicle comprising at least one control device for use in the vehicle, wherein the control device carries out a method for performing certification by a control device of a vehicle, wherein the method comprises generation of a first signed certificate, which comprises at least one public key, and generation of an associated private key, performance of a single-time introduction of the first signed certificate and of the associated private key into the control device, production of a second certificate, signing of a further public key in the control device, by the private key and the second certificate; and making available the signed further public key together with the first signed certificate, wherein subsequent to the single-time introduction, the control device in the vehicle is configured to generate certificates as its own vehicle-internal certification authority.

18. The vehicle of claim 17, the vehicle further comprising a control device, wherein the two control devices are connected to one another via a communication path, and the further control device transmits a public key via the communication path to the control device for signing.

19. The vehicle of claim 18, wherein the control device and the further control device protect the connection between the two control devices by symmetrical cryptographic methods.

* * * * *